United States Patent
Toda et al.

(10) Patent No.: US 11,526,690 B2
(45) Date of Patent: Dec. 13, 2022

(54) LEARNING DEVICE, LEARNING METHOD, AND COMPUTER PROGRAM PRODUCT

(71) Applicant: Kabushiki Kaisha Toshiba, Minato-ku (JP)

(72) Inventors: Takeshi Toda, Kawasaki (JP); Kosuke Haruki, Tachikawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 777 days.

(21) Appl. No.: 16/553,223

(22) Filed: Aug. 28, 2019

(65) Prior Publication Data
US 2020/0234082 A1 Jul. 23, 2020

(30) Foreign Application Priority Data

Jan. 22, 2019 (JP) .............................. JP2019-008649

(51) Int. Cl.
*G06K 9/62* (2022.01)
*G06N 3/08* (2006.01)
*G06V 10/30* (2022.01)

(52) U.S. Cl.
CPC ............. *G06K 9/6257* (2013.01); *G06N 3/08* (2013.01); *G06V 10/30* (2022.01)

(58) Field of Classification Search
CPC ........ G06K 9/6257; G06N 3/08; G06N 3/084; G06V 10/30; G06V 10/7747; G06V 10/82
See application file for complete search history.

(56) References Cited

U.S. PATENT DOCUMENTS

| | | | |
|---|---|---|---|
| 2018/0293762 A1* | 10/2018 | Fu ......................... | G06T 11/003 |
| 2019/0188503 A1* | 6/2019 | Orris, Jr. ............ | G08G 1/09623 |
| 2019/0362238 A1* | 11/2019 | Pietquin ................ | G06N 3/084 |
| 2020/0019840 A1* | 1/2020 | Guo ......................... | G06N 3/08 |
| 2020/0372321 A1* | 11/2020 | Tabuchi ................. | G06F 16/00 |
| 2020/0410228 A1* | 12/2020 | Wang ................ | G06V 30/1916 |
| 2021/0081801 A1* | 3/2021 | Sakai ..................... | G06N 5/046 |
| 2021/0397948 A1* | 12/2021 | Hara ....................... | G06N 3/08 |
| 2022/0019902 A1* | 1/2022 | Ustimenko ......... | G06F 16/9574 |

(Continued)

OTHER PUBLICATIONS

Wen, W., et al., "SmoothOut: Smoothing Out Sharp Minima to Improve Generalization in Deep Learning", arXiv: 1805.07898, Dec. 2, 2018, 10 pages.

(Continued)

*Primary Examiner* — Wesley J Tucker
(74) *Attorney, Agent, or Firm* — Oblon, McClelland, Maier & Neustadt, L.L.P.

(57) ABSTRACT

A learning device includes one or more processors. The processors generate a plurality of pieces of learning data to be used in a plurality of learning processes, respectively, to learn a parameter of a neural network using an objective function. The processors calculate a first partial gradient using a partial data and the parameter added with noise, with respect to at least a part of the learning data out of the plurality of pieces of learning data. The partial data is obtained by dividing the learning data. The first partial gradient is a gradient of the objective function relating to the parameter for the partial data. The noise is calculated based on a second partial gradient calculated for another piece of the learning data. The processors update the parameter using the first partial gradient.

7 Claims, 7 Drawing Sheets

(56) References Cited

U.S. PATENT DOCUMENTS

2022/0076119 A1\* 3/2022 Khoreva ................. G06T 7/13
2022/0279183 A1\* 9/2022 Besenbruch ........... H04N 19/91

OTHER PUBLICATIONS

Haruki, K., et al., "Gradient Noise Convolution (GNC): Smoothing Loss Function for Distributed Large-Batch SGD", arXiv: https://arxiv.org/abs/1906.10822, Jun. 26, 2019, 19 pages.

\* cited by examiner

LEARNING DEVICE, LEARNING METHOD, AND COMPUTER PROGRAM PRODUCT

CROSS-REFERENCE TO RELATED APPLICATIONS

This application is based upon and claims the benefit of priority from Japanese Patent Application No. 2019-008049, filed on Jan. 22, 2019; the entire contents of which are incorporated herein by reference.

FIELD

Embodiments described herein relate generally to a learning device, a learning method, and a computer program product.

BACKGROUND

In recent years, effective utilization of data by deep learning that is one of machine learning has been expected. In the deep learning, optimization by stochastic gradient descent (SGD) using a mini-batch is generally used. In addition, a technique for smoothing and optimizing an objective function by adding noise of a uniform random number to a parameter (such as a weight) to be optimized has been proposed.

DETAILED DESCRIPTION

According to one embodiment, a learning device includes one or more processors. The processors generate a plurality of pieces of learning data to be used in a plurality of learning processes, respectively, to learn a parameter of a neural network using an objective function. The processors calculate a first partial gradient using a partial data and the parameter added with noise, with respect to at least part of the learning data out of the plurality of pieces of learning data. The partial data is obtained by dividing the learning data. The first partial gradient is a gradient of the objective function relating to the parameter for the partial data. The noise is calculated based on a second partial gradient calculated for another piece of the learning data. The processors update the parameter using the first partial gradient.

Hereinafter, preferred embodiments of a learning device according to the present invention will be described in detail with reference to the accompanying drawings.

As described above, there is a case where a mini-batch, which is a part of data extracted from the entire learning data in learning of a neural network such as SGD. For example, if the learning is executed in parallel using a plurality of mini-batches, a learning process can be executed at a high speed.

In order to execute learning using large-scale learning data at a higher speed, it is sufficient to increase a mini-batch size (hereinafter referred to as a batch size) to be operated in parallel. However, there is a case where a model falls into a local solution with a large generalization error in learning using a large batch size.

Figure 1:
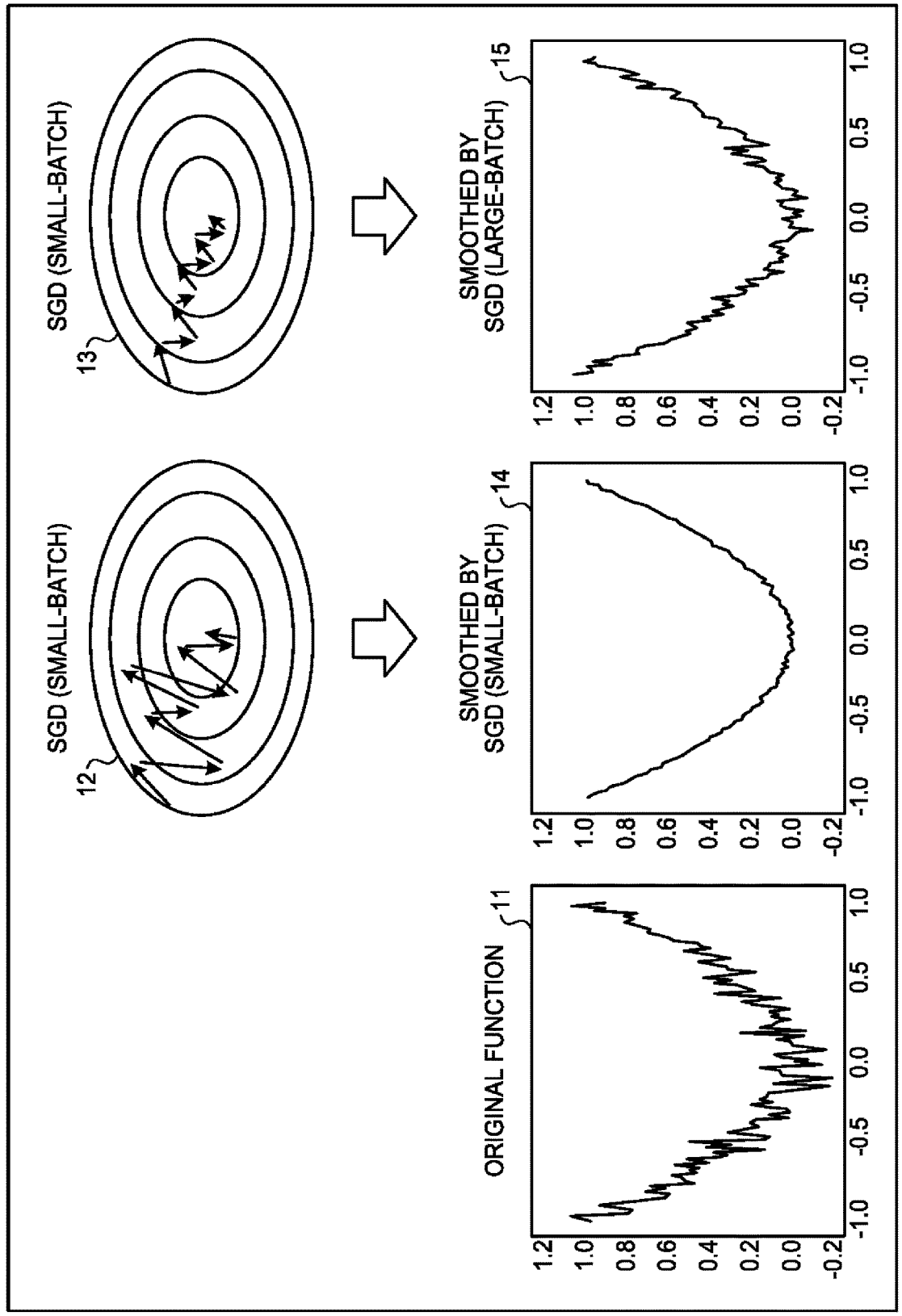
FIG. 1 is a view illustrating a relationship between a batch size, noise, and smoothing of an objective function.

FIG. 1 is a view illustrating an example of a relationship between a batch size, noise, and smoothing of an objective function. The objective function is a function to be optimized (minimized or maximized) in a learning process. The objective function is sometimes called a loss function or the like. In a learning method such as SGD, a gradient of the objective function is calculated and a parameter is updated based on a direction of the gradient. For example, the gradient represents a first-order derivative of the objective function with respect to the parameter. The parameter to be updated may be any information. For example, in the case of learning of a neural network, a weight (a weighting coefficient) and a bias cf the neural network serve as parameters. Hereinafter, a case where the weight. is mainly used as the parameter will be described as an example.

A graph 11 illustrates an example of an original objective function. A graph 12 illustrates an example of a change in noise when a batch size of SGD is decreased (a small batch size). A graph 13 illustrates an example of a change in noise when the batch size of SGD is increased (a large batch size). Graphs 14 and 15 illustrate examples of objective functions smoothed by SGD using the small batch size and the large batch size, respectively.

In SGD using the small batch size, the objective function is smoothed by noise components included in the gradient (the graph 14), it is possible to reach a solution with a small generalization error. On the other hand, in SGD using the large batch size, noise components included in the gradient are fewer as compared to the small batch size so that a smoothing effect also decreases (the graph 15), and there is a case where a model falls into a local solution with a large generalization error. In addition, the noise of SGD is known to have directivity depending on the objective function.

First Embodiment

When performing optimization using SGD, a learning device according to a first embodiment adds temporal noise to a weight using a partial gradient obtained in the course of calculating a gradient of a mini-batch to calculate a partial gradient of the next mini-batch. in the present embodiment, not a uniform random number but noise components (anisotropic noise) included in the partial gradient are used. Thus, it is possible to apply noise in an appropriate direction to a shape of the objective function, that is, to perform efficient smoothing in accordance with the objective function.

Figure 2:
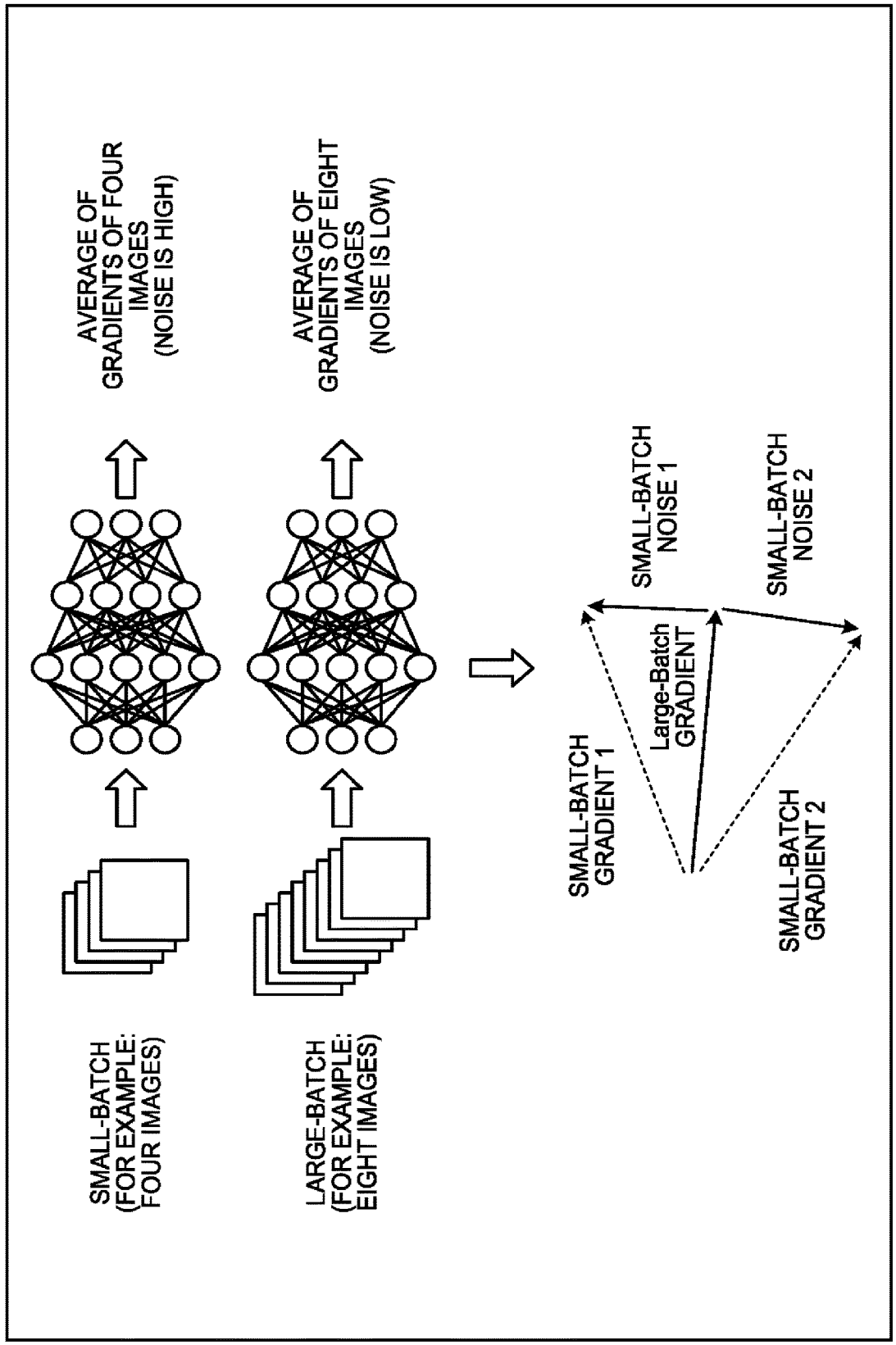
FIG. 2 is a view illustrating a concept of a method of calculating noise.

FIG. 2 is a view illustrating a concept of a method of calculating noise according to the present embodiment. The upper part of FIG. 2 illustrate cases where learning data of a small batch size (for example, four images) and a large batch size (for example, eight images) are input to a neural network to perform learning, and an average of gradients of a plurality of images is used as a gradient for the entire learning data. In the example of FIG. 2, an average of gradients of four images is calculated as the gradient of the learning data in the case of the small batch size of the four images. In addition, an average of gradients of eight images is calculated as the gradient of the learning data in the case of the large batch size of the eight images. Noise increases in the former case, but noise decreases in the latter case.

In the learning device of the present embodiment, the gradient (Large-Batch gradient) of the learning data of the large batch size is regarded as the average of the gradients (Small-Batch gradients 1 and 2) of a plurality of pieces of learning data of the small batch size, and noise used to calculate the gradient of the learning data of the small batch size is calculated based on this relationship. Hereinafter, the learning data of the large batch size will be referred to as a mini-batch, and a plurality of pieces of learning data obtained by further dividing the mini-batch will be referred to as a partial mini-batch (partial data). For example, a value based on difference of each of the gradients (Small-Batch gradients 1 and 2) of each partial mini-batch relative to the gradient (Large-Batch gradient) of the mini-batch is calculated as the noise.

Figure 3:
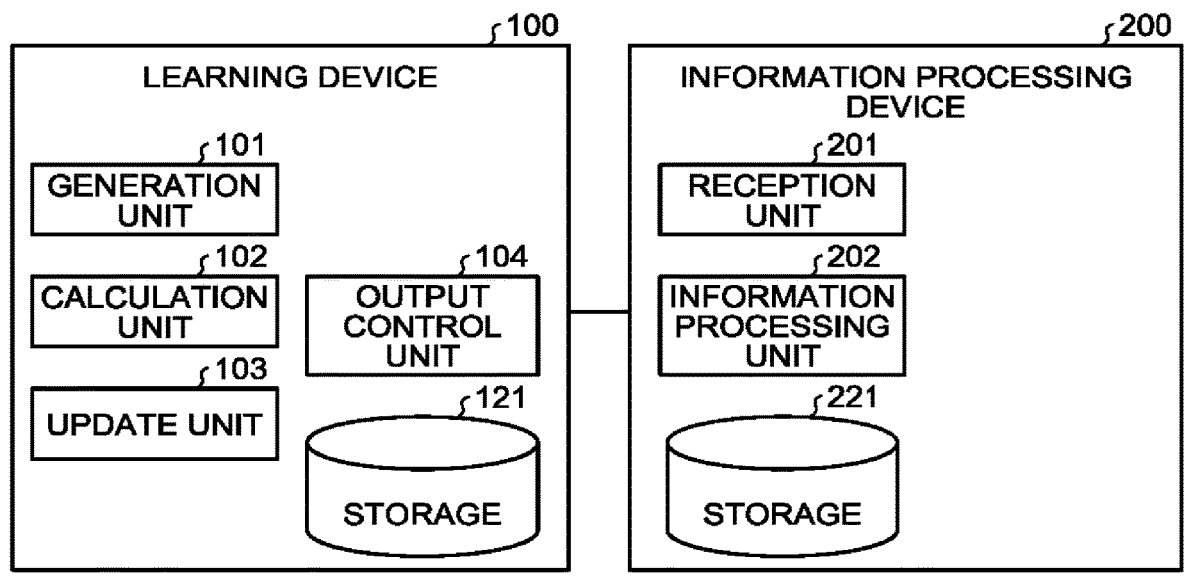
FIG. 3 is a block diagram of an information processing system according to a first embodiment.

FIG. 3 is a block diagram illustrating a configuration example of an information processing system according to the first embodiment. As illustrated in FIG. 3, the information processing system includes a learning device 100 and an information processing device 200. The learning device 100 and the information processing device 200 are connected via, for example, a communication network and a dedicated communication line. The communication network may be a communication network in any form such as a wired network, a wireless network, and the Internet. At least one of the learning device 100 and the information processing device 200 may be implemented by, for example, a server device that is a computer including a processor such as a central processing unit (CPU). The server device may be a cloud server that executes processing on a cloud.

The learning device 100 is a device that learns a neural network. The information processing device 200 is a device that executes processing (recognition processing, classification processing, and the like) using the learned neural network. The learning device 100 and the information processing device 200 are not necessarily separate devices, and for example, the learning device 100 may have a function of the information processing device 200.

The learning device 100 includes a generation unit 101, a calculation unit 102, an update unit 103, an output control unit 104, and storage 121.

The generation unit 101 generates learning data to be used for learning of a neural network. The generation unit 101 generates, for example, a plurality of mini-batches obtained by sampling some of a plurality of pieces of learning data (original learning data). Each mini-batch includes a plurality of pieces of learning data. This mini-batch is used in each of a plurality of learning processes to learn a parameter of the neural network.

The calculation unit 102 calculates various types of information to be used when learning the parameter of the neural network. For example, the calculation unit 102 calculates a gradient of an objective function with respect to a partial mini-batch obtained by dividing the mini-batch. Hereinafter, the gradient calculated with respect to the partial mini-batch will be sometimes referred to as a partial gradient. In addition, the calculation unit 102 also calculates a gradient with respect to the overall mini-batch using a partial gradient. Hereinafter, the gradient calculated with respect to the overall mini-batch will be sometimes referred to as an overall gradient. In addition, the calculation unit 102 also calculates noise to be added to a weight. Details of a method of calculating the partial gradient, the overall gradient, and the noise will be described later.

The update unit 103 updates a weight using a calculation result of calculation unit 102. Details of a method of updating the weight will be described later.

The output control unit 104 controls outputs of various types of information from the learning device 100. For example, the output control unit 104 outputs the learned parameter of the neural network. Although an output method may be any method, for example, the output control unit 104 outputs the parameter of the neural network to the information processing device 200 via the communication network.

The storage 121 stores various types of information used in various types of processing of the learning device 100. For example, the storage 121 stores a parameter of a neural network to be learned and learning data to be used for learning of the neural network.

The respective units (the generation unit 101, the calculation unit 102, the update unit 103, and the output control unit 104) of the learning device 100 are implemented by, for example, one or more processors. For example, the respective units may be implemented by causing a processor such as a CPU to execute a program, that is, software. The above-described respective units may be implemented by a processor such as a dedicated integrated circuit (IC), that is, hardware. The above-described respective units may be implemented using both the software and the hardware in combination. In the case of using the plurality of processors, each of the processors may implement one of the respective units, or may implement two or more of the respective units.

Next, a configuration of the information processing device 200 will be described. The information processing device 200 includes a reception unit 201, an information processing unit 202, and storage 221.

The reception unit 201 receives inputs of various types of information to be used in various types of processing of the information processing device 200. For example, the reception unit 201 receives the parameter of the neural network output from the learning device 100.

The information processing unit 202 executes information processing using a neural network. The information processing is, for example, image recognition processing image classification processing using a neural network. The information processing is not limited thereto, and any processing using a neural network may be used. For example, the information processing may be recognition processing and classification processing to be performed on data (text, voice, and the like) other than an image.

The storage 221 stores various types of information to be used in various types of processing of the information processing device 200. For example, the storage 221 stores the parameter of the neural network output from the learning device 100.

The respective units (the reception unit 201 and the information processing unit 202) of the information processing device 200 are implemented by, for example, one or more processors. For example, the respective units may be implemented by causing a processor such as a CPU to execute a program, that is, software. The above-described respective units may be implemented by a processor such as a dedicated IC, that is, hardware. The above-described respective units may be implemented using both the software and the hardware in combination. In the case of using the plurality of processors, each of the processors may implement one of the respective units, or may implement two or more of the respective units.

The storage 121 and 221 can be configured using various storage media that are generally used such as a flash memory, a memory card, a random access memory (RAM), a hard disk drive (HDD), and an optical disc.

Next, specific examples of the method of calculating the partial gradient, the overall gradient, and the noise, and the method of updating the weight will be described. A learning process is repeatedly executed T times using T (T is an integer of two or more) mini-batches, and the weight is updated in each learning process. In each learning process, calculation of partial gradients for a plurality of partial mini-batches obtained by dividing a mini-batch, calculation of an overall gradient using the partial gradients, and the like are performed.

The calculation unit 102 calculates an overall gradient $G_t$ of the t-th (t is an integer satisfying $1 \leq t \leq T$) learning process using the following Formula (1). Here, N represents the number of partial gradients, and $g_t^n$ represents a partial gradient calculated for an n-th (n is an integer satisfying $1 \leq n \leq N$) partial mini-batch in the t-th learning process.

$$G_t = \frac{1}{N}\sum_{n=1}^{N} g_t^n \qquad (1)$$

The update unit 103 calculates a weight $w_{t+1}$ used in the (t+1)-th learning process using the following Formula (2). Here, $w_t$ represents a weight used in the t-th learning process, and $\eta_t$ represents a learning coefficient.

$$w_{t+1} = w_t - \eta_t G_t \qquad (2)$$

It is possible to interpret that Formula (2) is a formula that calculates the weight (a second parameter) for the mini-batch used in the (t+1)-th learning by updating the weight $w_t$ (a first parameter) calculated for the mini-batch (another learning data) used in the t-th learning process using the overall gradient.

The calculation unit 102 calculates noise $\theta_{t+1}^n$ to be added to the weight $w_{t+1}$ using the following Formula (3).

$$\theta_{t+1}^n = G_t - g_t^n \qquad (3)$$

The calculation unit 102 calculates a partial gradient $g_{t+1}^n$ using the following Formula (4) in the (t+1)-th learning process.

$$g_{t+1}^n = \nabla f(w_{t+1} + \theta_{t+1}^n) \qquad (4)$$

Figure 4:
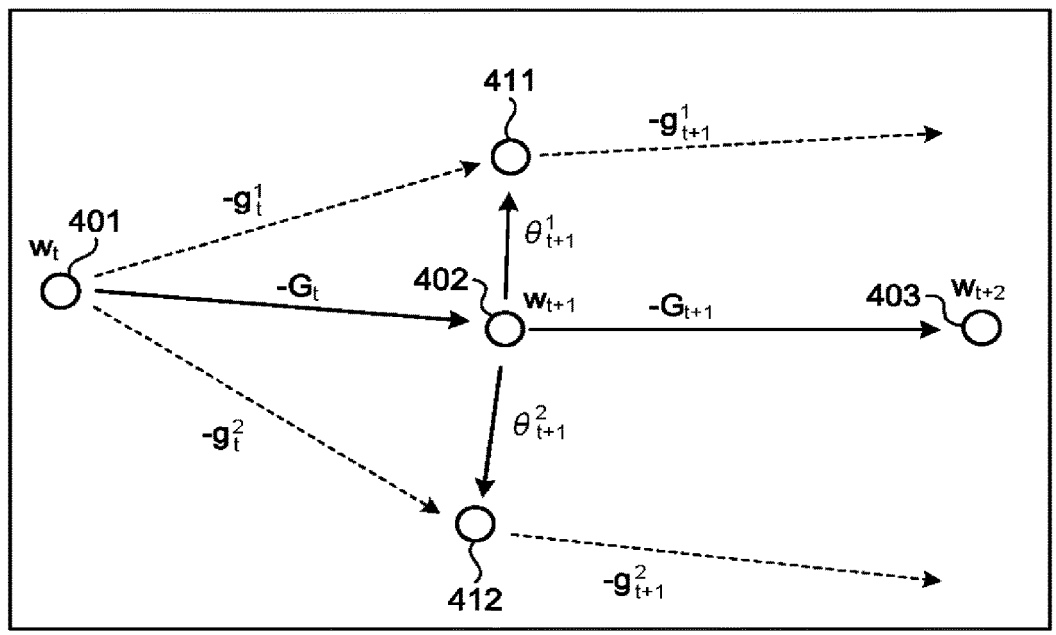
FIG. 4 is a view illustrating an example of a relationship among a partial gradient, an overall gradient, a and weight.

In this manner, the noise to be added to the weight is calculated based on a difference between the overall gradient and the partial gradient in the present embodiment. FIG. 4 is a view illustrating an example of a relationship among the partial gradient, the overall gradient, and the weight. Incidentally, it is assumed that the number of partial gradients N=2 and the learning coefficient $\eta_t=1$ in the example of FIG. 4 in order to simplify the description. In addition, it is assumed that no noise is added to the weight $w_t$ in the t-th learning process in the example of FIG. 4. For example, in the first learning process (t=1), noise is not calculated since there is no information corresponding to the partial gradient and the overall gradient calculated in the previous learning process.

Weights 401 to 403 represent weights used in the t-th, (t+1)-th, and (t+2)-th learning processes, respectively. For example, the weight 402 ($w_{t+1}$) is calculated from the weight 401($w_t$) and the gradient $G_t$ according to Formula (2). Weights 411 and 412 represent weights added with noise. For example, the weight 411 is calculated by adding noise $\theta_{t+1}^1$ to the weight 402($w_{t+1}$). The noise $\theta_{t+1}^1$ is calculated based on a difference between the overall gradient $G_t$ and a partial gradient $g_t^1$ as illustrated in FIG. 4. The (t+2)-th and subsequent processes are similarly repeated.

Incidentally, the process of adding noise is not necessarily executed in all the second and subsequent learning processes, and may be executed in only some of the learning processes. For example, noise may be added in a learning process in the m-th and subsequent learning processes (m is an integer satisfying $3 \leq m \leq T$), or noise may be added every fixed number of times.

In addition, a learning method that is applicable to the present embodiment is not limited to SGD, and the invention can be applied to other learning methods using gradients. For example, learning methods (optimization algorithms) such as a momentum method, the Nesterof's acceleration method, AdaGrad, and Adam may be used.

In addition, the calculation unit 102 may calculate, as noise, a value obtained by multiplying the difference between the overall gradient and the partial gradient illustrated on the right side of Formula (3) by a coefficient α. For example, the following values can be used as the coefficient α.

Positive scalar value
Learning coefficient $\eta_t$
Weight norm $\|w_{t+1}\|$
Update vector norm $\|-\eta_t G_t\|$
Combination of all or some of the above values The weight norm (update vector norm) is, for example, a norm of all weights (update vectors) calculated for all layers of the neural network at the time of the (t+1)-th learning process.

Figure 5:
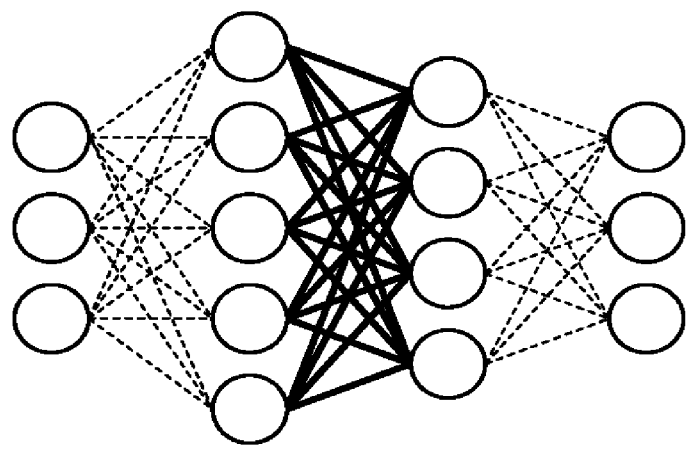
FIG. 5 is a view illustrating an example of a calculation target.
Figure 6:
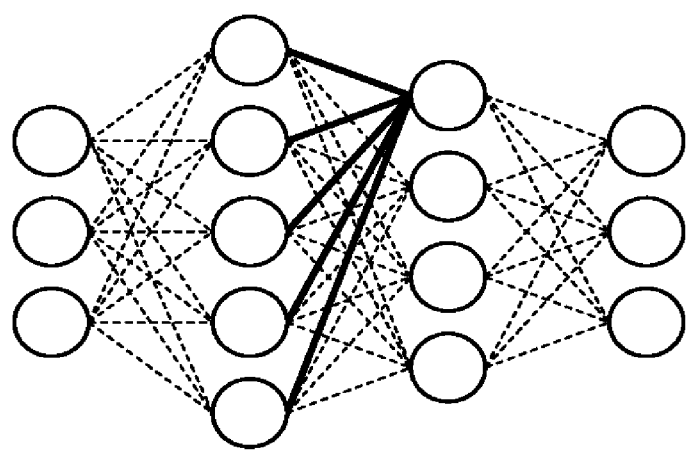
FIG. 6 is a view illustrating an example of the calculation target.

When the weight norm (or update vector norm) is the coefficient θ, only some weights (update vectors) may he used instead of the weights (update vectors) of all the layers of the neural network. For example, a weight norm (update vector norm) may be calculated using only weights (update vectors) (indicated by solid lines) relating to a layer set as a current calculation target as illustrated in FIG. 5. In addition, a weight norm (update vector norm) may be calculated using only weights (update vectors) (indicated by solid lines) relating to a unit set as a current calculation target as illustrated in FIG. 6.

Figure 7:
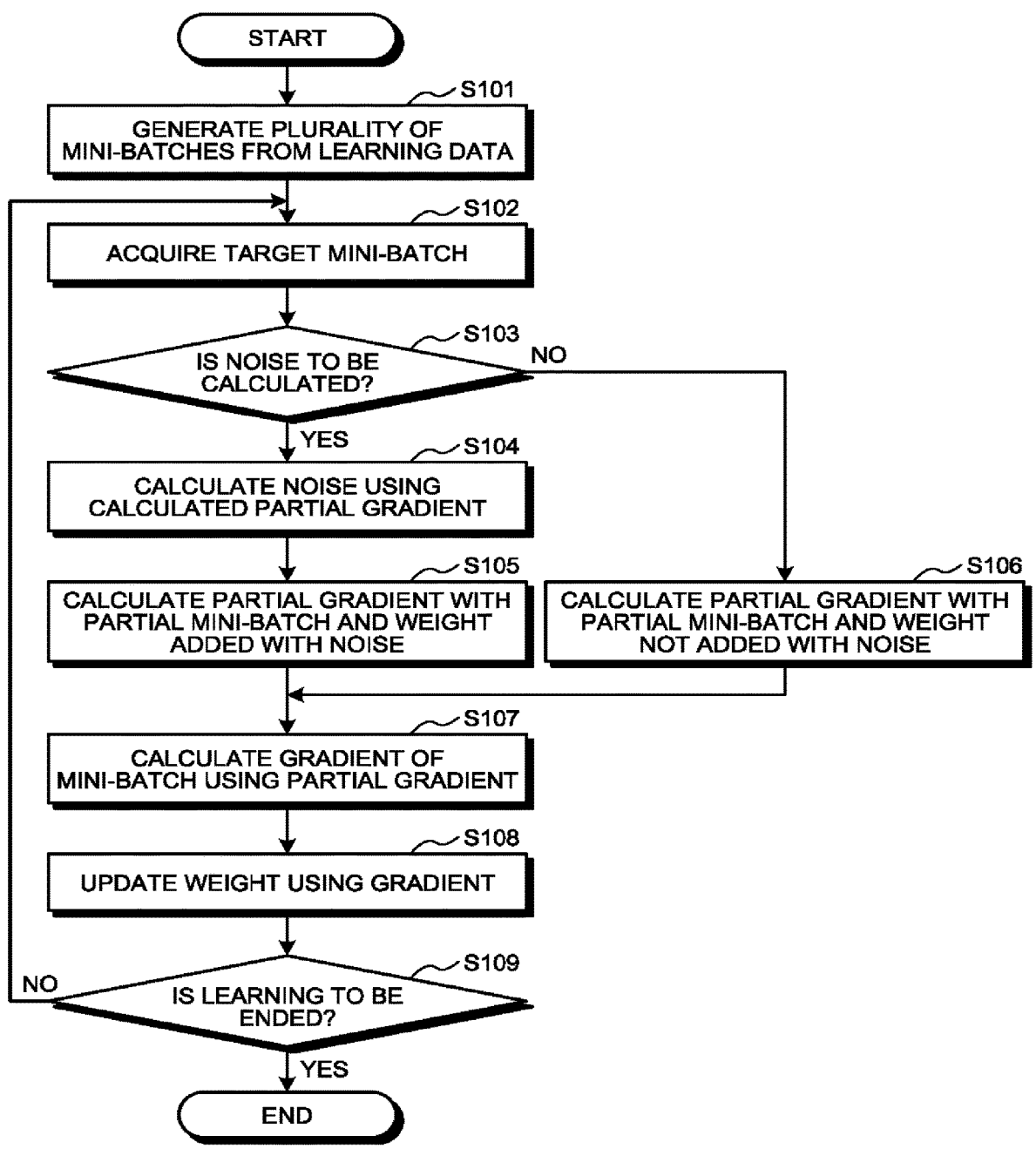
FIG. 7 is a flowchart of parameter update processing according to the first embodiment.

Next, a description will be given regarding parameter update processing of the neural network using the learning device 100 according to the present embodiment configured as described above. FIG. 7 is a flowchart illustrating an example of the parameter update processing according to the first embodiment.

The generation unit 101 generates a plurality of mini-batches, for example, from learning data stored in the storage 121 (Step S101).

The calculation unit 102 acquires one mini-batch to be used for the learning process out of the plurality of mini-batches (Step S102). The calculation unit 102 determines whether to calculate noise in a current learning process (Step S103). For example, the calculation unit 102 determines not to calculate noise when the learning process corresponds to the number of times in which the noise is not to be calculated, such as the first learning process. When it is determined to add noise in the m-th and subsequent learning processes as described above, the calculation unit 102 may determine not to calculate noise in the first to (m−1)-th learning processes.

When it is determined to calculate noise (Step Yes), the calculation unit 102 calculates noise using a partial gradient that has been already calculated in the previous time (Step S104). For example, the calculation unit 102 calculates the noise using the above-described Formula (3). In addition, the calculation unit 102 calculates a partial gradient using a partial mini-batch and a weight added with the noise (Step S105). For example, the calculation unit 102 calculates the partial gradient using the above Formula (4).

When it determined not calculate noise (Step S103: No), the calculation unit 102 calculates a partial gradient using the partial mini-batch and a weight to which the noise is not added (Step S106). For example, the calculation unit 102 calculates the partial gradient using a formula obtained by replacing "$w_{t+1}+\theta_{t+1}'''$" in the above Formula (4) by "$w_{t+1}$".

Incidentally, Steps S104 to S106 are executed for each partial mini-batch obtained by dividing the mini-batch acquired in Step S102.

The calculation unit 102 calculates the gradient (overall gradient) of the mini-batch using the partial gradients calculated for the respective partial mini-batches (Step S107). For example, the calculation unit 102 calculates the overall gradient using the above Formula (1).

The update unit 103 updates the weight using the calculated overall gradient (Step S108). For example, the update unit 103 calculates the updated weight using the above Formula (2).

The update unit 103 determines whether to end learning (Step S109). For example, when all the mini-batches have been processed, the update unit 103 determines to end the learning. A method of determining the end of learning is not limited thereto, and any method may be used.

When it is determined not to end the learning (Step S109: No), the processing returns to Step S102, and the processing is repeated for the next mini-batch. When it is determined to end the learning (Step S109: Yes), the parameter update processing is ended.

Figure 8:
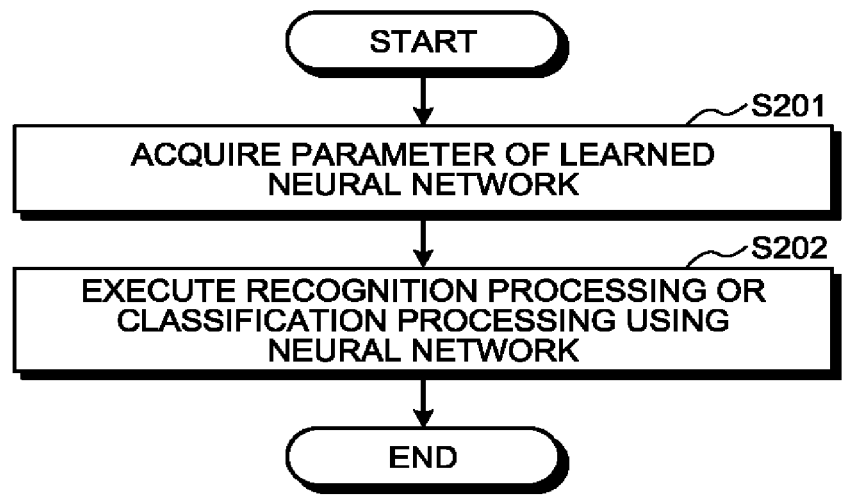
FIG. 8 is a flowchart of information processing according to the first embodiment.

Next, information processing using the information processing device 200 according to the present embodiment will be described. FIG. 8 is a flowchart illustrating an example of the information processing according to the present embodiment.

The reception unit 201 of the information processing device 200 acquires a parameter of a learned neural network from, for example, the learning device 100 (Step S201). The information processing unit 202 executes the information processing using the neural network defined by the acquired parameter (Step S202). The information processing unit 202 executes the information processing according to a purpose of use of the neural network. For example, when the neural network is a neural network used for image recognition, the information processing unit 202 executes image recognition processing using this neural network. For example, when the neural network is a neural network used for image classification, the information processing unit 202 executes image classification processing using this neural network.

In this manner, temporal noise is added to the parameter using the partial gradient obtained in the course of calculating the gradient of the mini-batch to calculate a partial gradient of the next mini-batch in the learning device according to the first embodiment. The noise is calculated based on noise components included in the partial gradient. Thus, it is possible to apply the noise in an appropriate direction to a shape of the objective function, and to perform efficient smoothing in accordance with the objective function.

Second Embodiment

The noise depends on the overall gradient in the first embodiment. The overall gradient is calculated as an average of a plurality of partial gradients. Meanwhile, if it is configured such that a plurality of partial gradients are calculated in parallel by a plurality of devices, respectively and an average is calculated through communication among the plurality of devices, it is possible to improve the speed of a learning process. In a second embodiment, such a configuration is assumed such that the dependency between the noise and the overall gradient is eliminated, and the next partial gradient can be calculated in parallel with the inter-device communication processing.

Figure 9:
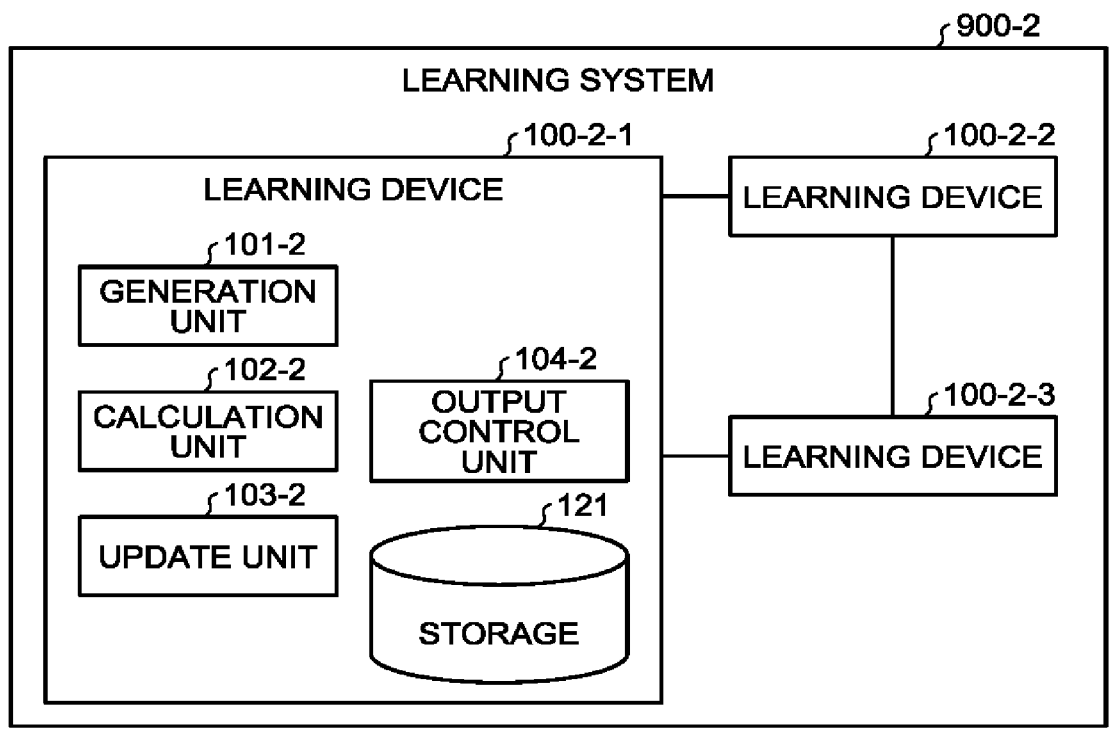
FIG. 9 is a block diagram of a learning system according to a second embodiment.

FIG. 9 is a block diagram illustrating an example of a configuration of a learning system according to the second embodiment. As illustrated in FIG. 9, a learning system 900-2 of the present embodiment includes learning devices 100-2-1, 100-2-2, and 100-2-3. Incidentally, the learning system 900-2 may be connected to the information processing device 200 similarly to FIG. 3 although omitted in FIG. 9. That is, the information processing system may be configured to include the learning system 900-2 and the information processing device 200. In addition, the same functions as those in FIG. 3, which is the block diagram of the learning device 100 according to the first embodiment, will be denoted by the same reference signs, and the description thereof will be omitted here.

The learning devices 100-2-1, 100-2-2, and 100-2-3 execute partial gradient calculation processing and the like for partial mini-batches obtained by dividing one mini-batch in a distributed manner. The learning devices 100-2-1, 100-2-2, and 100-2-3 have the same configuration, and thus, will be simply referred to as learning devices 100-2 in some cases when there is no need for distinguishment. The number of the learning devices 100-2 is not limited to three, and may be two or four or more.

The learning device 100-2 includes a generation unit 101-2, a calculation unit 102-2, an update unit 103-2, an output control unit 104-2, and the storage 121.

The generation unit 101-2 is different from the generation unit 101 of the first embodiment in terms that the generation unit 101-2 generates learning data to be processed by the own device. The generation unit 101-2 communicates with, for example, the generation unit 101-2 of the other learning device 100-2, thereby generating learning data to be processed by the own device so as not to overlap with learning data generated by the other learning devices 100-2.

The calculation unit 102-2 is different from the calculation unit 102 of the first embodiment in terms that noise and a partial gradient are calculated using learning data generated for the own device and that an overall gradient for the overall mini-batch is calculated using partial gradients calculated by the calculation units 102-2 of the other learning devices 100-2 and the partial gradient calculated by the own device.

For example, the calculation units 102-2 of the respective learning devices 100-2 can acquire a sum of a plurality of partial gradients calculated by the plurality of learning devices 100-2 using a collective communication algorithm (MPI_Allreduce), which is called Allreduce defined by message passing interface (MPI), and calculate an overall gradient as an average of the sum of the plurality of partial gradients. Although the case of using MPI_Allreduce has been described here, another process similar to the MPI_Allreduce may be executed.

The update unit 103-2 updates a weight using a calculation result of the calculation unit 102-2. The update unit 103-2 can update the weight using the overall gradient calculated by the calculation unit 102-2, that is, the overall gradient obtained in consideration of the partial gradients calculated using the learning data of the other learning devices 100-2.

The output control unit 104-2 is different from the output control unit 104 of the first embodiment in terms of transmitting and receiving the calculation result such as the partial gradient to and from the other learning devices 100-2, for example, via a communication network. Incidentally, a parameter (weight) is similarly updated in the respective learning devices 100-2 in the present embodiment. That is, the respective learning devices 100-2 store the same neural network parameter in the storage 121. Therefore, any of the output control units 104-2 of the respective learning devices 100-2 may output the parameter, for example, in the case of outputting the parameter to the information processing device 200 or the like.

Next, a description will be given regarding specific examples of a method of calculating a partial gradient, an overall gradient, and noise and a method of updating a weight in the present embodiment. In the present embodiment, calculation of partial gradients for partial mini-batches, calculation of an overall gradient using the partial gradients calculated in a distributed manner, and the like are executed by the plurality of learning devices 100-2 in a distributed manner.

For example, the calculation unit 102-2 of each of the learning devices 100-2 calculates the overall gradient $G_t$ of the t-th learning process using the above Formula (1). As described above, the calculation unit 102-2 can calculate the overall gradient based on a sum of partial gradients calculated by all the learning devices 100-2 as well as the own device using, for example, MPI_Allreduce. The update unit 103-2 calculates the weight $w_{t+1}$ to be used in the (t+1)-th learning process using the above Formula (2).

In the present embodiment, the calculation unit 102-2 calculates the noise $\theta_{t+1}^n$ to be added to the weight $w_{t+1}$ using the following Formula (5).

$$\theta_{t+1}^n = -g_t^n \quad (5)$$

The calculation unit 102-2 calculates a partial gradient $g_{t+1}^n$ using the following Formula (6) in the (t+1)-th learning process.

$$g_{t+1}^n = \nabla f(w_t + \theta_{t+1}^n) \quad (6)$$

Figure 10:
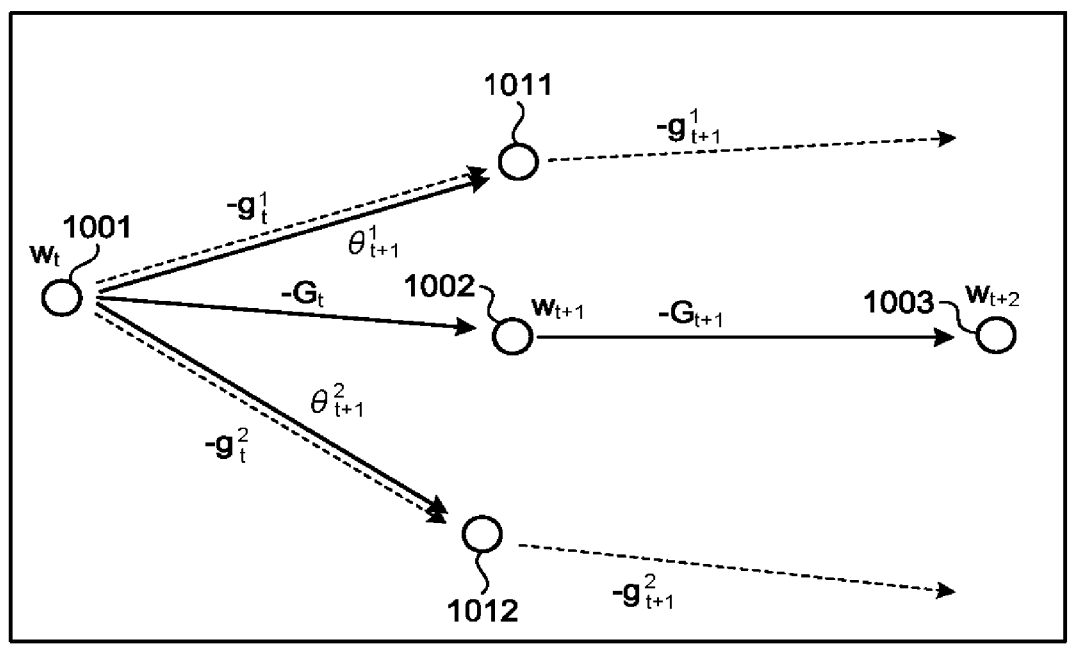
FIG. 10 is a view illustrating an example of a relationship among a partial gradient, an overall gradient, and a weight.

In this manner, the noise to be added to the weight is calculated based on the partial gradient in the present embodiment. FIG. 10 is a view illustrating an example of a relationship among the partial gradient, the overall gradient, and the weight. Incidentally, it is assumed that the number of partial gradients N=2 and the learning coefficient $\eta_t = 1$ in the example of FIG. 10 in order to simplify the description. In addition, it is assumed that no noise is added to the weight $w_t$ in the t-th learning process in the example of FIG. 10.

Weights 1001 to 1003 represent weights used in the t-th, (t+1)-th, and (t+2)-th learning processes, respectively. For example, the weight 1002($w_{t+1}$) is calculated from the weight 1001 ($w_t$) and the gradient $G_t$ according to Formula (2). Weights 1011 and 1012 represent weights added with noise. For example, the weight 1011 is calculated by adding noise $\theta_{t+1}^1$ to the weight 1001($w_t$). The noise $\theta_{t+1}^1$ is calculated by multiplying the partial gradient $g_t^1$ by "−1" as illustrated in FIG. 10. The (t+2)-th and subsequent processes are similarly repeated.

When comparing Formula (6), which is the formula to calculate the partial gradient in the present embodiment, and Formula (4), which is the formula to calculate the partial gradient in the first embodiment, a difference is that $w_{t+1}$ is changed to $w_t$. In this manner, it is possible to interpret that the value obtained by adding the noise to the weight ($w_{t+1}$) used in the (t+1)-th learning process is estimated using the value obtained by adding the noise to the weight ($w_t$) used in the t-th learning process in the present embodiment. That is, in the present embodiment, the partial gradient is calculated using the value obtained by adding the noise to the weight $w_t$ (first parameter) calculated for the mini-batch (another learning data) used in the t-th learning process.

In addition, since there is no dependency between Formulas (1) and (2) and between Formulas (5) and (6), the processing can be performed in parallel. As a result, it is possible to improve the speed of the learning process.

The overall flow of the learning process in the second embodiment is the same as that in FIG. 7 illustrating the example of the learning process in the first embodiment. In the second embodiment, the processing (Steps S104, S105, and S106) for the partial mini-batch is performed in a distributed manner by the respective learning devices 100-2.

Even in the present embodiment, an applicable learning method is not limited to SGD, other learning methods using gradients (the momentum method, the Nesterov's acceleration method, AdaGrad, and Adam, and the like) can be applied. In addition, the noise may be calculated using the coefficient α, which is similar to the first embodiment.

Modification 1

In addition, a learning device having the same configuration as that of the first embodiment may be configured to calculate noise according to the calculation formula of the present embodiment. In this case, it is difficult to calculate partial gradients in parallel, but it is possible to obtain the same effects as those of the first embodiment, that is, noise can be applied in a direction appropriate for a shape of an objective function, efficient smoothing can be performed in accordance with the objective function, and the like.

Modification 2

In addition, a learning device having the same configuration as that of the second embodiment may b configured to calculate noise according to a calculation formula of the first embodiment. For example, three learning devices 100-2 may calculate partial gradients for a plurality of partial mini-batches obtained by dividing a mini-batch into three partial mini-batches in parallel in a distributed manner using Formula (4) that is the formula to calculate the partial gradient in the first embodiment. Incidentally, the number of the learning devices 100-2 and the number of the mini-batch division are not limited to three. In addition, each size and the number of partial mini-batches to be allocated to each of the learning devices 100-2 may be changed in accordance with a hardware configuration and a resource.

In the present modification, the plurality of partial gradients calculated in parallel are transmitted and received among the plurality of learning devices 100-2 using MPI_Allreduce or the like, and further, an overall gradient is calculated. Although cost for communication of the partial gradients increases, it is possible to speed up a learning process as compared to the first embodiment by calculating the respective partial gradients in parallel.

Incidentally, the overall gradient is used to calculate the weight (the weight depends on the overall gradient) in the first embodiment and the second modification. On the other hand, the overall gradient is not used to calculate the weight (the weight does not depend on the overall gradient) in the second embodiment. Thus, it is possible to execute the calculation of the overall gradient accompanied by communication (Formulas (1) and (2)) and the calculation of the partial gradient (Formulas (5) and (6)) in parallel as described above. Therefore, the second embodiment can speed up the learning process further as compared to the second modification.

Modification 3

In addition, any learning device 100-2 (master node) among the plurality of learning devices 100-2 may be configured to calculate an overall gradient and a weight on behalf of the other learning devices 100-2 (worker nodes). The master node is a device that controls processing to be executed in a distributed manner. The worker nodes execute processing for partial mini-batches under control of the master node. In the present third modification, since the master node executes generation of learning data and update of the weight, the worker node does not have to include the generation unit 101-2 and the update unit 103-2.

The generation unit 101-2 of the master node outputs the generated learning data to the respective worker nodes. For example, the generation unit 101-2 of the master node outputs partial mini-batches other than a partial mini-batch to be processed by the own device, out of the partial mini-batches obtained by dividing the generated mini-batch, to the respective worker nodes. For example, when one of the three learning devices 100-2 is the master node and two are the worker nodes, the generation unit 101-2 of the master node outputs one of the partial mini-batches obtained by dividing the mini-batch into three partial mini-batches to be processed inside own device, and outputs the other two partial mini-batches to the two worker nodes. Incidentally, the number of divisions is not limited to three. In addition, each size and the number of partial mini-batches to be allocated to each of the learning devices 100-2 may be changed in accordance with a hardware configuration and a resource.

In the third modification, the partial gradients calculated by all the learning devices 100-2 included in the learning system 900-2 are aggregated into the master node, and the master node calculates an overall gradient using the aggregated partial gradients. In this case, it is possible to efficiently execute transmission of the partial gradient from the worker node to the master node and the calculation of the overall gradient, for example, using a collective communication algorithm (MPI_Reduce) called "Reduce" that is defined by MPI. The master node transmits the calculated weight to the respective worker nodes. For example, the master node transmits the updated weight to the respective worker nodes using MPI_Bcast that is defined in MPI. Although the case of using MPI_Reduce and HPI_Bcast has been described here, other processes similar to the MPI_Reduce and MPI_Bcast may be executed.

In this manner, a part of the calculation processing in the learning process is executed by the plurality of learning devices in a distributed manner in the second embodiment. As a result, it is possible to improve the speed of the learning process.

As described above, it is possible to perform the efficient smoothing in accordance with the objective function according to the first and second embodiments.

Figure 11:
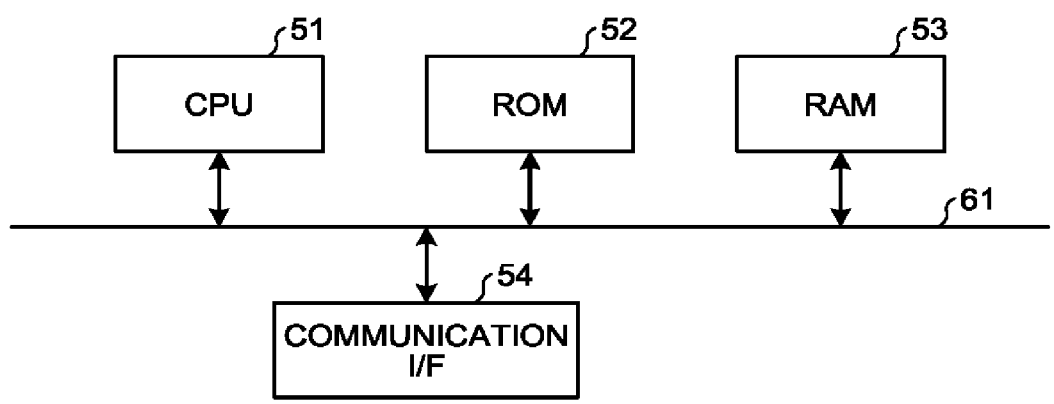
FIG. 11 is a hardware configuration diagram of a learning device according to the first or second embodiment.

Next, a hardware configuration of the learning device according to the first or second embodiment will be described with reference to FIG. 11. FIG. 11 is an explanatory diagram illustrating the hardware configuration example of the learning device according to the first or second embodiment.

The learning device according to the first or second embodiment includes: a control device such as a CPU 51; a storage device such as a read only memory (ROM) 52 and a RAM 53; a communication I/F 54 connected to a network to perform communication; and a bus 61 that connects the respective units.

A program to be executed by the learning device according to the first or second embodiment is provided by being incorporated in advance in the ROM 52 or the like.

The program to be executed by the learning device according to the first or second embodiment may be configured to be recorded in a file in an installable format or an executable format in a computer-readable recording medium such as a compact disk read only memory (CD-ROM), a flexible disk (FD), compact disk recordable (CD-R), and a digital versatile disk (DVD), provided as a computer program product.

In addition, it may be configured such that the program executed by the learning device according to the first or second embodiment is stored in a computer connected to the network such as the Internet and is provided through download via the network. In addition, it may be configured such that the program executed by the learning device according to the first or second embodiment is provided or distributed via the network such as the Internet.

The program executed by the learning device according to the first or second embodiment allows a computer to function as the respective units of the learning device described above. This computer can read and execute the program from the computer-readable storage medium on the main storage device by the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
one or more processors configured to:
generate a plurality of pieces of learning data to be used in a plurality of learning processes, respectively, to learn a parameter of a neural network using an objective function;
calculate a first partial gradient using a partial data and the parameter added with noise, with respect to at least a part of the learning data out of the plurality of pieces of learning data, the partial data being obtained by dividing the learning data, the first partial gradient being a gradient of the objective function relating to the parameter for the partial data, the noise being calculated based on a second partial gradient calculated for another piece of the learning data; and update the parameter using the first partial gradient.

2. The learning device according to claim 1, wherein the one or more processors calculate an overall gradient using a plurality of partial gradients calculated for a plurality of pieces of partial data obtained by dividing the learning data, the overall gradient being a gradient of the objective function relating to the parameter for the learning data, and calculate the noise using the overall gradient and the second partial gradient.

3. The learning device according to claim 2, wherein the one or more processors calculate the noise using a difference between the overall gradient and the second partial gradient.

4. The learning device according claim 2, wherein the one or more processors calculate a second parameter for the learning data by updating a first parameter calculated for the other learning data using the overall gradient, and calculate the first partial gradient using the second parameter added with the noise and the partial data.

5. The learning device according to claim 1, wherein the one or more processors calculate the first partial gradient using a value that is obtained by adding the noise to a first parameter calculated for the other learning data, and the partial data.

6. A learning method comprising:

generating a plurality of pieces of learning data to be used in a plurality of learning processes, respectively, to learn a parameter of a neural network using an objective function;

calculating a first partial gradient using a partial data and the parameter added with noise, with respect to at least a part of the learning data out of the plurality of pieces of learning data, the partial data being obtained by dividing the learning data, the first partial gradient being a gradient of the objective function relating to the parameter for the partial data, the noise being calculated based on a second partial gradient calculated for another piece of the learning data; and updating the parameter using the first partial gradient.

7. A computer program product having a non-transitory computer readable medium including programmed instructions, wherein the instructions, when executed by a computer, cause the computer to perform:

generating a plurality of pieces of learning data to be used in a plurality of learning processes, respectively, to learn a parameter of a neural network using an objective function; and calculating a first partial gradient using a partial data and the parameter added with noise, with respect to at least a part of the learning data out of the plurality of pieces of learning data, the partial data being obtained by dividing the learning data, the first partial gradient being a gradient of the objective function relating to the parameter for the partial data, the noise being calculated based on a second partial gradient calculated for another piece of the learning data; and updating the parameter using the first partial gradient.

* * * * *